United States Patent [19]
Trumbull et al.

[11] 3,885,820
[45] May 27, 1975

[54] TUBING CONNECTOR

[76] Inventors: Walter A. Trumbull, Midland; James A. Schlosser, Bay City, both of Mich.;

[73] Assignee: The Dow Chemical Company, Midland, Mich.

[22] Filed: Nov. 5, 1973

[21] Appl. No.: 412,946

[52] U.S. Cl............ 285/137 R; 285/331; 285/370; 285/423
[51] Int. Cl............................................. F16l 39/00
[58] Field of Search........ 285/137 R, 331, 423, 397, 285/371, 370; 138/115, 116, 117; 174/84 R, 95, 97

[56] References Cited
UNITED STATES PATENTS
1,166,059  12/1915  Ledbetter ............................ 285/234

| | | |
|---|---|---|
| 2,340,926 | 2/1944 | Bradley ............................ 285/137 R |
| 3,110,753 | 11/1963 | Witort ........................ 285/137 R X |
| 3,524,661 | 8/1970 | Farnam ............................... 285/239 |

FOREIGN PATENTS OR APPLICATIONS
773,671  9/1934  France ............................ 285/137 R

*Primary Examiner*—Dave W. Arola
*Attorney, Agent, or Firm*—Robert B. Ingraham

[57] ABSTRACT

A tubing connector is provided for a multiple passage tube. The connector has at least 2 passages running therethrough. The passages are separated by a slotted wall which receives a separating member for the tubing.

3 Claims, 3 Drawing Figures

TUBING CONNECTOR

A wide variety of multiple passage tubing is known and some of such tubing finds use for trickle irrigation. One variety of tubing which is particularly desirable is prepared from thin flexible plastic film and has at least two passageways therein, the passageways being defined by the outermost or circumferential portion of the tubing and a laterally extending separating membrane within the tubing. Generally such passages are of unequal size, one passage being employed for supply and the remaining passage being a discharge passage. Alternately, the tube may be employed to convey two different fluids. However, for irrigation applications the separating membrane is perforated as is a portion of the peripheral wall. For irrigation applications, connecting two lengths of such tubing has, in many cases, been avoided due to the difficulty in providing a relatively leak-tight connection there-between. Oftentimes it is desirable to have more or less continuous lengths of such tubing in an installation where such continuous lengths are longer than the lengths of tubing that are readily available. Furthermore, it is oftentimes desired to repair damaged sections of such tubing by removing the damaged section and providing a coupling and/or a new section between the remaining portions of the tubing.

It would be desirable if there were available an improved connector for multiple passage tubing.

It would also be desirable if there were an improved connector available which would permit the connecting of tubing without the use of special tools.

It would further be desirable if there were available an improved connector which would permit ready field repair.

These benefits and other advantages are achieved in accordance with the present invention in a connector for a multiple passage tube, the connector comprising a body portion having at least a first end of generally cylindrical configuration, the first end having defined therein a first passageway and a second passageway, each of the passageways being in full communication with space external to the first end, the body defining at least one wall separating the first and second passages, the wall between said first and second passages at a location adjacent the first end defining a slot extending inwardly into the wall from said first end.

Further features and advantages of the present invention will become more apparent from the following specification taken in connection with the drawing wherein.

Figure 1:
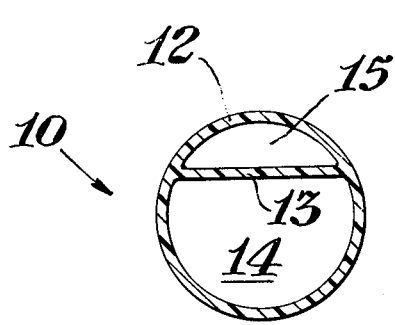
FIG. 1 is a schematic cross-sectional representation of one embodiment of a tube to be joined by a connector of the present invention.

In FIG. 1 there is schematically represented a cross-section of one embodiment of a tube used with the present invention designated by the reference numeral 10. The tube 10 beneficially is of thin flexible material such as a plastic, for example, polyethylene. The tube 10 has an external or peripheral wall 12 and as shown in inflated condition, has a generally circular cross-section. The tube 12 has an internal wall 13 positioned generally as the chord of a circle. The inner wall and outer wall together define a first major passageway 14 and a second or minor passageway 15.

Figure 2:
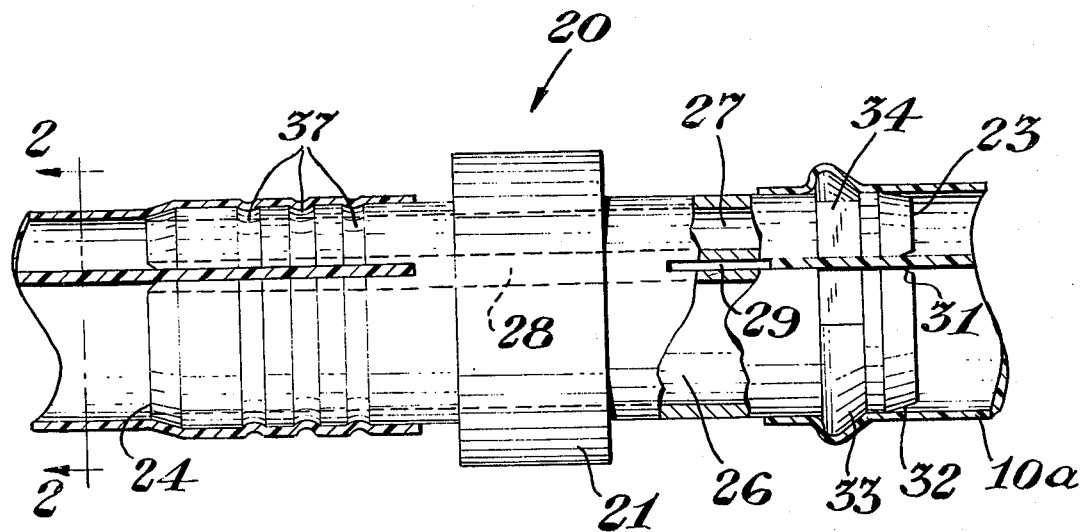
FIG. 2 is a schematic side view of an embodiment of a connector in accordance with the invention.
Figure 3:
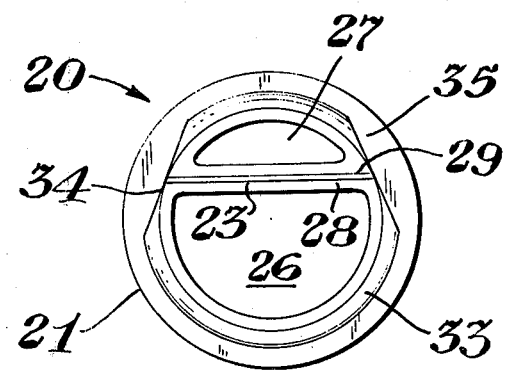
FIG. 3 is an end view of the connector of FIG 2.

In FIGS. 2 and 3 there is schematically depicted side and end views of a coupling in accordance with the invention generally designated by the reference numeral 20. The coupling 20 comprises a body 21 having a first end 23 and a second end 24. The first end 23 and second end 24 are of generally circular cross-section. The coupling 20 defines therein a first or major passageway 26 and a second or minor passageway 27 and a wall 28 disposed between and separating the passages 26 and 27. The passageways 26 and 27 are in full communication with space external to the ends 23 and 24 and extend entirely through the coupling 20. A transverse slot 29 is defined by the coupling 20 adjacent the end 23. The slot 29 is in full communication with space external to the end 23 both in the axial and diametrical directions. Immediately adjacent the end 23 at a location designated by the reference numeral 31 the generally parallel walls of the slot 29 become outwardly divergent. Immediately adjacent the end 23 an external surface portion 32 of the coupling 20 defines a generally frustoconical outwardly convergent portion. Between the portion 32 and the body 21 is a generally circumferentially disposed protuberance or tubing retaining means 33. A tube 10a having a cross-sectional configuration generally similar to the tube 10 of FIG. 1 is disposed over the end 23 and the protuberance 33. The generally annular protuberance 33 has a first flat surface 34 and a second flat surface 35. The flat surfaces 34 and 35 are generally tangentially disposed to a groove 29. As depicted in FIG. 2, the second end 24 of the coupling 20 is identical in construction to the end 23 with the exception that the protuberance 33 has been removed and replaced by tube retaining grooves 37.

FIGS. 1, 2 and 3 are purely schematic and should not be relied upon for dimensions.

In operation of the coupling 20 shown in FIGS. 2 and 3, tubing is readily applied thereto in the generally conventional manner of pushing the tubing over the tapered or convergent end of the coupling. However, in view of the internal wall of the tube, it is frequently found advantageous that in severing the end of the tube the inner wall should project slightly forward of the adjacent outer walls in order that as the coupling is inserted into the tubing the inner wall enters the divergent slot region 31 and enters the slot 29 before substantial stretching of the tube over the end 23 or 24, as the case may be, occurs. Thus, one is assured of correct alignment of the inner wall 13. In certain instances when the inner wall of the tubing such as the wall 13 has dimensions somewhat greater than the slot or groove, it is advantageous to temporarily enlarge the slot by a wedging action such as is obtained with a pocketknife blade. The tubing is then pushed onto a connector and the wedging device removed. The flattened surfaces 34 and 35 on the retainer 33 considerably ease the problem of placing the tubing over the end 23 as this configuration requires that the tube wall 12 must stretch slightly but does not demand significant stretching of the chordal wall 13. The configuration of the first end 23 is particularly suited for tubing which exhibits at least some elasticity, can be conveniently stretched and the tubing exhibits sufficient spring back that the protuberance 33 is tightly engaged. The arrangement of the second end 24 is eminently satisfactory for use with relatively rigid tubes that exhibit little tendency to stretch and is used with great advantage with tubing that is shrinkable such as by the application of heat. Advantageously, the tubing that is shrinkable may be pushed over the end 24, heated slightly in the region of the grooves 37 to a temperature just sufficient to cause the tubing to decrease slightly in diameter and engage the grooves 37. If desired, the slot 29 may be made somewhat wider than the thickness of a web such as the web 13 and a small amount of mastic or other sealing composition placed therein immediately prior to applying the tubing. Such an arrangement is particularly satisfactory when the couplings are to be employed by persons having little manual dexterity.

In a manner similar to the coupling of FIG. 2, other connectors are readily prepared for tubes having two or more passages therein.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A connector for a multiple passage tube, the connector comprising
   a body portion having at least
   a first tube receiving end of generally cylindrical configuration, the first tube receiving end having defined therein
   a first passageway and
   a second passageway, each of the passageways being in full communication with space external to the first end, the body defining at least
   one wall separating the first and second passages, the wall between said first and second passages at a location adjacent the first end defining
   a first end slot extending inwardly into the wall from said first tube receiving end, the first end slot being generally parallel the first and second passageway and communicating with space external to the first tube receiving end both in axial and diametrical direction,
   a second end of generally cylindrical configuration, having a second end first passageway and a second end second passageway, said second end passageways being in full communication with first and second passageways of the first end,
   the second end defining a second end slot extending toward the first end slot, the second end slot disposed between the first end first and second passageways, the first and second slots being of generally like configuration.

2. A connector for a multiple passage tube, the connector comprising
   a body portion having at least
   a first tube receiving end of generally cylindrical configuration, the first tube receiving end having defined therein
   a first passageway and
   a second passageway, each of the passageways being in full communication with space external to the first end, the body defining at least
   one wall separating the first and second passages, the wall between said first and second passages at a location adjacent the first end defining
   a first end slot extending inwardly into the wall from said first tube receiving end, the first end slot being generally parallel the first and second passageway and communicating with space external to the first tube receiving end both in axial and diametrical directions,
   an annular tube engaging groove extending generally about the cylindrical first end, the groove being circumferentially disposed.

3. A connector for a multiple passage tube, the connector comprising
   a body portion having at least
   a first tube receiving end of generally cylindrical configuration, the first tube receiving end having defined therein
   a first passageway and
   a second passageway, each of the passageways being in full communication with space external to the first end, the body defining at least
   one wall separating the first and second passages, the wall between said first and second passages at a location adjacent the first end defining
   a first end slot extending inwardly into the wall from said first tube receiving end, the first end slot being generally parallel the first and second passageway and communicating with space external to the first tube receiving end both in axial and diametrical directions,
   an annular tube engaging means extending generally about the cylindrical first end, the tube engaging means comprises a plurality of circumferentially disposed protuberances.

* * * * *